(12) United States Patent
Barbieri et al.

(10) Patent No.: US 9,940,382 B2
(45) Date of Patent: Apr. 10, 2018

(54) SYSTEM AND METHOD FOR SEARCHING A LABELED PREDOMINANTLY NON-TEXTUAL ITEM

(71) Applicant: KONINKLIJKE PHILIPS N.V., Eindhoven (NL)

(72) Inventors: Mauro Barbieri, Eindhoven (NL); Johannes Henricus Maria Korst, Eindhoven (NL); Serverius Petrus Paulus Pronk, Vught (NL); Ramon Antoine Wiro Clout, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 303 days.

(21) Appl. No.: 14/653,277

(22) PCT Filed: Sep. 29, 2013

(86) PCT No.: PCT/IB2013/058974
§ 371 (c)(1),
(2) Date: Jun. 18, 2015

(87) PCT Pub. No.: WO2014/097000
PCT Pub. Date: Jun. 26, 2014

(65) Prior Publication Data
US 2015/0324446 A1 Nov. 12, 2015

Related U.S. Application Data

(60) Provisional application No. 61/739,819, filed on Dec. 20, 2012.

(51) Int. Cl.
*G06F 17/30* (2006.01)

(52) U.S. Cl.
CPC .. *G06F 17/30598* (2013.01); *G06F 17/30038* (2013.01); *G06F 17/30864* (2013.01)

(58) Field of Classification Search
CPC combination set(s) only.
See application file for complete search history.

(56) References Cited

U.S. PATENT DOCUMENTS

| 8,098,976 B1 | 1/2012 | Acharya | |
|---|---|---|---|
| 2005/0114471 A1* | 5/2005 | Murakoshi | G11B 19/025 709/219 |

(Continued)

FOREIGN PATENT DOCUMENTS

| JP | 2005196598 A | 7/2005 |
|---|---|---|
| JP | 2008139942 A | 6/2008 |

(Continued)

*Primary Examiner* — Etienne Leroux
(74) *Attorney, Agent, or Firm* — Larry Liberchuk

(57) ABSTRACT

A data base system is disclosed for storing meta-data about labeled predominantly non-text items in a collection of labeled predominantly non-text items (lpnt items). The system comprises a storage facility (10), a keyword generation facility (20) and a meta-data enrichment facility (30). The storage facility (10) stores respective meta-data for lpnt items (i) within said collection, said meta-data comprising at least one lpnt item classification (gi) and a lpnt item description (Ti), said classification defining classes. The keyword generation facility (20), which generates keyword data for respective classes, comprises a retrieval module for retrieving terms from lpnt item descriptions of lpnt items associated with said classes. The keyword generation facility (20) further comprises a term relevance determining module for assigning a relevance of said terms for said classes, for selecting terms from said retrieved terms on the basis of their assigned relevance and providing these selected terms as candidate keywords. The system further comprises a meta-data enrichment facility (30) for adding a subset (Ki) of the provided candidate keywords (K(c)) as keywords to the meta-data of lpnt items of a class.

15 Claims, 7 Drawing Sheets

(56) References Cited

U.S. PATENT DOCUMENTS

| | | |
|---|---|---|
| 2005/0160460 A1 | 7/2005 | Fujiwara |
| 2010/0082575 A1 | 4/2010 | Walker |
| 2010/0172581 A1* | 7/2010 | Husoy ................ G06K 9/00261 |
| | | 382/165 |
| 2010/0226582 A1 | 9/2010 | Luo |
| 2012/0197890 A1* | 8/2012 | Franks .............. G06F 17/30053 |
| | | 707/737 |
| 2013/0054605 A1* | 2/2013 | Yeh ................... G06F 17/30569 |
| | | 707/740 |
| 2013/0110838 A1* | 5/2013 | Lidy ................ G06F 17/30598 |
| | | 707/737 |

FOREIGN PATENT DOCUMENTS

| | | |
|---|---|---|
| JP | 2009163600 A | 7/2009 |
| WO | WO2011033457 A1 | 3/2011 |

* cited by examiner

SYSTEM AND METHOD FOR SEARCHING A LABELED PREDOMINANTLY NON-TEXTUAL ITEM

FIELD OF THE INVENTION

The present invention relates to a system for searching a labeled predominantly non-textual item within a collection of labeled predominantly non-textual items.

The present invention further relates to a method for searching a labeled predominantly non-textual item within a collection of labeled predominantly non-textual items.

RELATED ART

Predominantly non-textual items are considered items in which text only forms a minor contribution to the information content. Particular examples thereof are play-items for reproduction by a digital media reproduction device, such as movies and songs. Although play-items include spoken or sung text, the wording of the text therein only contributes to the data content to a very small amount. Predominantly non-textual items may have a brief description e.g. a title and possibly a summary of its content. Labeled predominantly non-textual items (further denoted as lpnt items) are predominantly non-textual items that have a classification.

Play-items are items such as movies that can be reproduced on a media player. Search engines are provided in order to facilitate a user to find a particular play-item within a collection of play-items. Typically these items are labeled, for example using the IMDB genre indication comprising the genres Action, Adventure, Animation, Biography, Comedy, Crime, Documentary, Drama, Family, Fantasy, Film-Noir, Game-Show, History, Horror, Music, Musical, Mystery, News, Reality-TV, Romance, Sci-Fi, Sport, Talk-Show, Thriller, War and Western. Although play items may comprise text content, for example in the form of dialogues or lyrics, the text content is usually not available for searching purposes. To a limited extent meta-data of the play-item may comprise text content, e.g. the title, artist and sometimes a brief description.

In that connection, US2005160460 discloses an information processing apparatus and an information processing method for enabling users to search for broadcast content. The apparatus has a search space processing section that acquires a search keyword based on search information coming from a user terminal, and searches a search keyword dictionary database for search-related keyword data related to the search keyword. On the basis of the search keyword and the search-related keyword data, the search space processing section generates a search keyword space and submits the generated space to a correction process. A search processing section compares the corrected search keyword space, EPG data, and an EPG keyword space for a match. A search display processing section prepares a list of display-ready information from the result of the matching and sends the list to the user terminal.

The known search engine, however, still has shortcomings as is illustrated by the following example. Assume that a user wants to search in a large video-on-demand repository for an Italian mafia movie and that the repository does not have a specific genre label for mafia movies, but that instead these movies are typically labeled with genres 'action', 'gangster', and 'italian'. Now, the user could simply use the word 'mafia' as a query in a full-text search. Potentially, the description of the movie 'The Godfather' may actually not contain the word 'mafia', and as a result, this movie will not be returned as a result in the full-text search.

In general, a user can miss interesting play-items that match his current interests by applying a full-text search on the play-items' descriptions, simply because a keyword that the user would typically associate with a given play-item, or a search related keyword retrieved from a dictionary is not explicitly given in the play-item's description.

SUMMARY OF THE INVENTION

It is an object of the present invention to provide a system that at least partly mitigates the above-mention shortcoming.

It is an object of the present invention to provide a method that at least partly mitigates the above-mention shortcoming.

According to a first aspect of the invention a system is provided as claimed in claim 1.

According to a second aspect of the invention a method is provided as claimed in claim 11.

In the system according to the first aspect of the invention and the method according to the second aspect of the invention, the set of keywords provided by the user is enriched by further keywords obtained from a genre specification.

As indicated above, in an lpnt item, in particular a play-item text has only a minor contribution to the information content. A measure for this contribution is the ratio between the amount of data necessary to encode the text occurring in the lpnt item in ascii code divided by the total amount of data used for encoding the lpnt item.

BRIEF DESCRIPTION OF THE DRAWINGS

These and other aspects are described in more detail with reference to the drawing. Therein.

DETAILED DESCRIPTION OF EMBODIMENTS

Like reference symbols in the various drawings indicate like elements unless otherwise indicated.

Figure 1:
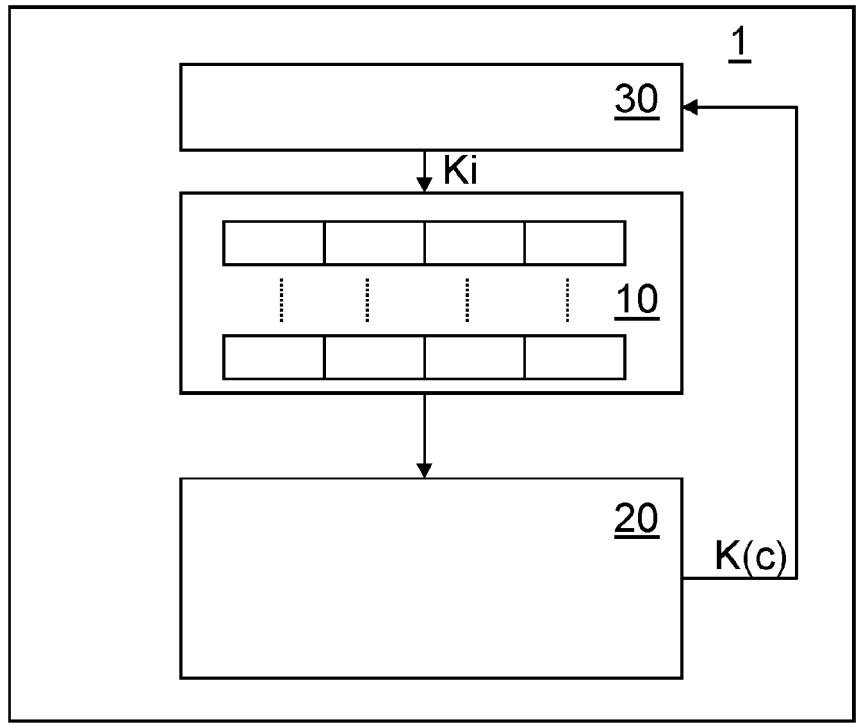
FIG. 1 schematically shows an embodiment of a data base system according to the first aspect of the invention, FIG. 1A schematically shows a first approach for assigning classes to lpnt items, FIG. 1B schematically shows a second approach for assigning classes to lpnt items.

FIG. 1 schematically shows a data base system according to the first aspect of the invention for storing meta-data about labeled predominantly non-text items in a collection of labeled predominantly non-text items (lpnt items). As indicated above, in an lpnt item text has only a minor contribution to the information content. A measure for this contribution is the ratio between the amount of data necessary to encode the text occurring in the lpnt item in ascii code divided by the total amount of data used for encoding the lpnt item.

By way of example a song of 3 minutes encoded as an mp3-item uses about 1 to 10 Mbyte of storage space. According to a rough estimation the text of the song may comprise up to 2000 characters, which can be represented by 2 kByte. Accordingly, the text contributes not more than about 0.2% to the total information content of the song.

As another example, a movie with a duration of two hours may be encoded with about 1 GB. The text contained in the movie, spoken, or as closed captions may be encoded with 80 kB. Accordingly, the text contributes not more than about 0.00008% to the total information content of the movie.

As a general rule the amount of data necessary to encode the text occurring in an lpnt item in ascii code is at most 1% of the total amount of data used for encoding the lpnt item.

It is noted that the minor contribution of text to the information content in an lpnt item is in sharp contrast to items in document retrieval systems.

Typically lpnt items only comprise a brief description, i.e. not more than a few hundred words, e.g. less than 100 words. In some situations only the title of the item may be available as the description, which usually contains even less than 10 words.

Figure 1A:
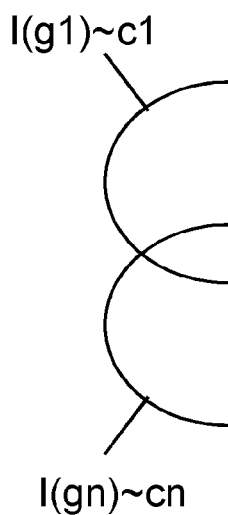

Each lpnt item in the collection has one or more labels associated to it. Given the set of all labels $G=\{g1, g2, \ldots, gn\}$, let for a lpnt item i the labels associated to i be given by $Gi \subset G$. Furthermore, let I(c) be the set of lpnt items belonging to a class c. Different approaches are possible to define classes and to determine the lpnt items belonging to each class. In one extreme case as illustrated in FIG. 1A, each class is defined by a single label. In that case the classes are overlapping if a lpnt item may be assigned one or more labels. For example a first class c1 is defined by all lpnt items having label g1, a second class c2 is defined by all lpnt items having label g2, and so on until an $n^{th}$ class cn which is defined by label gn. In this case a lpnt item with labels g1, g2 for example belongs to each of the classes c1 and c2.

Figure 1B:
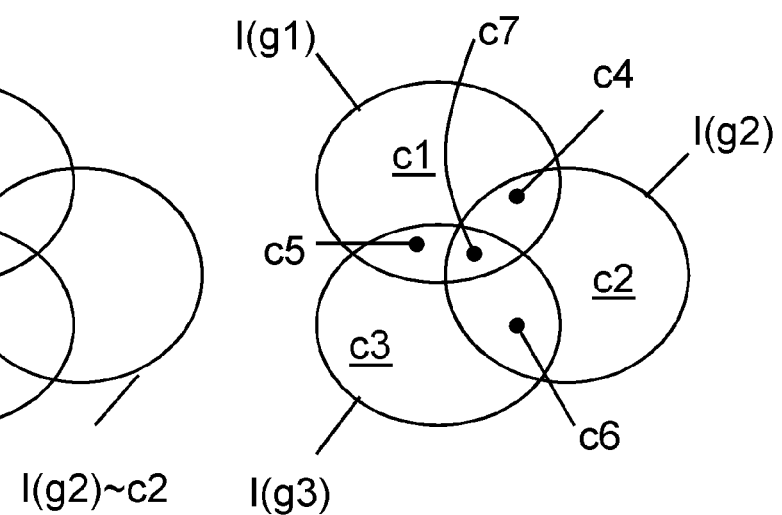

In another extreme case the class c of a lpnt item i is determined by the set of labels Gi. In that case each lpnt item belongs to exactly one class and the classes are mutually non-overlapping. This is illustrated in FIG. 1B. Therein three labels g1, g2, g3 are provided which define 7 classes. The first three classes are c1, c2, c3 containing lpnt items with only label g1, g2 and g3 respectively. The four remaining classes are c4 of all lpnt items with label g1 and g2, class c5 of all lpnt items with label g1 and g3, class c6 of all lpnt items with label g2 and g3, and class c7 of all lpnt items with label g1 and g2 and g3. In this way, with the same set of labels a more fine-grained classification is obtained. A hybrid approach is possible, for example to achieve that each class contains roughly the same number of lpnt items. For example, if it is found in the situation depicted in FIG. 1B that class c7 only contains one or two lpnt items, then class c7 may be deleted and instead, these lpnt items may be assigned to each of the classes c4, c5, c6.

The data base system of FIG. 1 comprises a storage facility 10 having stored therein respective meta-data Gi, Ti for lpnt items i within said collection as schematically indicated in Table 1. The meta-data comprises at least one lpnt item label, i.e. as subset Gi of one or more labels and a lpnt item description Ti assigned to the lpnt item i. The storage facility 10 may further comprise a pointer to the location of the content of the lpnt item. In some cases the content may be stored within said storage facility 10.

TABLE 1

| Meta data Gi, Ti for lpnt items i | | |
|---|---|---|
| Lpnt item | set of labels | description |
| 1 | G1 | T1 |
| ... | ... | ... |
| i | Gi | Ti |
| ... | ... | ... |
| n | Gn | Tn |

Figure 2:
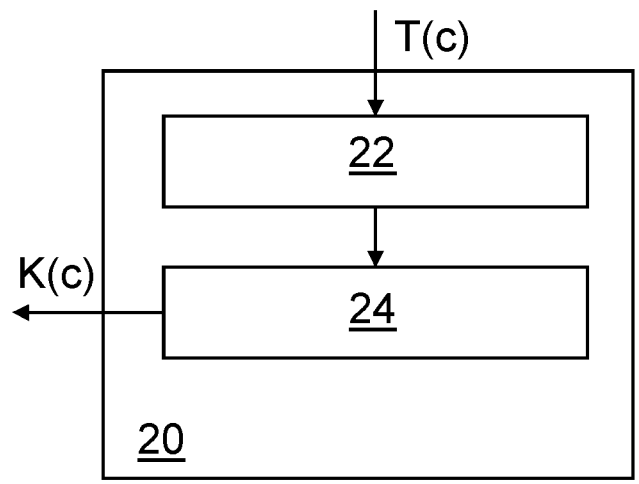
FIG. 2 shows a part of the embodiment of the data base system of FIG. 1.

The data base system of FIG. 1 further includes a keyword generation facility 20 for generating keyword data for respective classes c. As shown in more detail in FIG. 2, the keyword generation facility 20 comprises a retrieval module 22 for retrieving terms from lpnt item-descriptions of lpnt items associated with said classes. Accordingly, for each class, the retrieval module 22 determines which lpnt items belong thereto, and determines the terms contained in the descriptions of these lpnt items. The keyword generation facility 20 further comprises a term relevance determining module 24 for assigning a relevance R(t,c) of said terms for said classes. Based on the assigned relevance R(t,c) terms are selected from said retrieved terms T(c) on the basis of their assigned relevance R(t,c) and the selected terms are provided as keywords K(c). Accordingly the keywords K(c) provided for a class c are a subset of the terms T(c) retrieved for said class c from the descriptions of the associated documents. Typically only a fraction (e.g. less than 10%) of the terms T(c) is selected as a keyword K(c).

Often the labels used for classification of the lpnt items are predefined. E.g. in a movie database the movies may have assigned the IMDB genre labels defined above. However, as indicated above, classes may be defined on the basis of combination of genre-labels, e.g. a separate class may be defined for movies having both labels "drama" and "romance". This has the advantage that only a more limited subset of lpnt items has to be analyzed and that the terms found may better reflect the content of these lpnt items than in case the terms are obtained by combining terms from term lists from classes based only on one label. Nevertheless if a class based on a combination of genre-labels would comprise only a very limited number of lpnt items, it may be considered to remove this class and instead assign the lpnt items to classes defined by individual labels or by sub-combinations of labels.

Various options are possible to determine the relevance of a term T(c) for a class. For example, the relevance determining module 24 may count the number of lpnt items in the class that contain the term in their description and compare this number to the number of lpnt items that would be expected to contain the term on the basis of a known frequency of the term in common use. To that end the relevance determining module 24 may have a lookup table including the latter information.

Figure 2A:
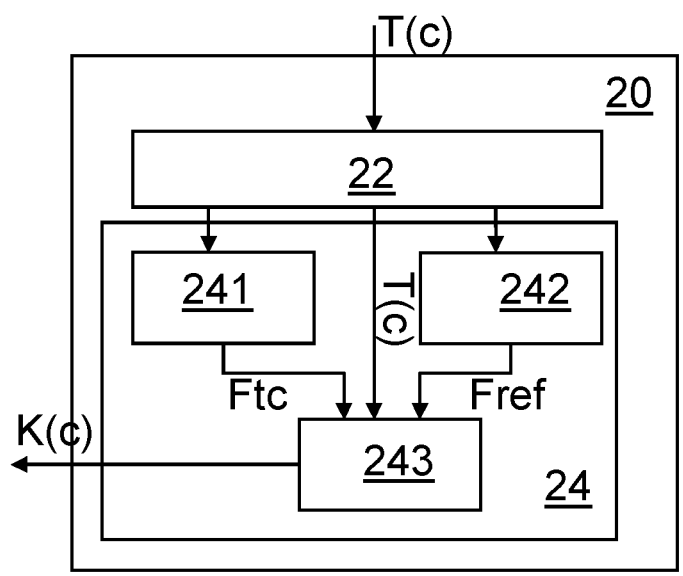
FIG. 2A shows said part in more detail.

FIG. 2A shows a particular arrangement of the relevance determining module 24 in an embodiment of the data base system. Therein the relevance determining module 24 comprises a term frequency analysis unit 241 for providing a frequency indication Ftc indicative of a frequency of terms T(c) for lpnt items having a respective class c according to said classification. The keyword generation device 24 further comprises a reference unit 242 for providing a reference indication Fref indicative of a frequency of the term T(c) in the collection of lpnt items as a whole. The keyword generation device 24 further comprises a normalization unit 243 for determining the relevance of the term for class c in accordance with said frequency indication Ftc and said reference indication Fref. Based on the relevance assigned by the relevance determining module 24 a set of keywords K(c) for a class c is selected from the terms T(c) found within the descriptions of the lpnt items i of the class c. The selected keywords Kw may for example be all terms T(c) that have a relevance higher than a predetermined value. Alternatively, the top Nt terms from a list of terms T(c) that is ranked according to decreasing relevance may be selected, wherein Nt is a predetermined number. In another embodiment a selection may be made according to a combination of criteria, for example all terms are selected that either are in the top Nt of the list or have a relevance higher than a threshold value. In again another embodiment the keywords K(c) are selected from the terms T(c) that appear in the top Nt of the list and that in addition have a relevance higher than a threshold value.

It is noted that various options are possible to determine the frequency indication Ftc.

According to a first approach the frequency indication Ftc is the raw frequency, i.e. the number of times a term T(c) occurs in a lpnt item description of class c.

According to a second approach the frequency indication Ftc is based on the "Boolean frequency". The Boolean frequency a term with respect to a lpnt item is set to 1 if the term appears in the lpnt item description and the term frequency is set to 0 if it does not appear therein. Accordingly the frequency indication Ftc is the number of lpnt items having a description that contains the term T(c) at least once. In an embodiment another threshold than one may be used for this measure.

According to a third approach the frequency indication is the logarithmically scaled frequency, i.e. Ftc=1+log f(t,c) (and 0 when f(t,c)=0); Therein f(t,c) is the raw frequency of the terms in class c.

The frequency indication Ftc may be scaled to account for the difference in length of the descriptions and/or the number of lpnt items in a class. To that end the raw frequency f(t,c) may be scaled by the maximum raw frequency of any term in the class, or by the total number of terms in the class. This is not necessary if the lpnt items are classified according substantially equally sized classes and descriptions of substantially equal length. Furthermore the length of the descriptions need not to be taken into account if the frequency indication Ftc is based on the "Boolean frequency". A scaling for to take into account the size of the descriptions and the class size is not necessary either if the selected keywords are the top Nt terms from a list of terms T(c) that is ranked according to decreasing relevance.

In order to exclude common frequently occurring terms that have no relevance for a particular class also a reference indication Fref is determined for terms T(c). The indication Fref is used as a weighting factor for the frequency indication FTc. The reference indication is a measure indicating whether the term is common or rare across the entire collection of lpnt items. The term is typically obtained by determining the logarithm of the quotient of the total number of lpnt items divided by the number of lpnt items that contain the term. It is noted that this measure may alternatively be estimated from a representative subset of the entire collection. In again another embodiment the reference indication Fref to be used as the weighting factor may be the inverse value of total count of the term in the entire collection. Alternatively the reference indication Fref used as the weighting factor may be the inverse frequency of the term in normal use of the term. This data may be available as a lookup table.

The data base system further comprises a meta-data enrichment facility 30 for adding a respective subset of the provided candidate keywords K(c) found for a class c as keywords to the meta-data of lpnt items i of a class. For lpnt items assigned to only one class it is sufficient to add to the meta-data of those lpnt items the candidate keywords K(c) found for that class. The subset of the provided candidate keywords K(c) may comprise all candidate keywords. However, typically the subset provides a selection of the candidate keywords that were provided. E.g. candidate keywords that are already present in the lpnt item description of an lpnt item may be excluded for that lpnt item. Also other candidate keywords may be excluded in the resulting subset for a specific lpnt item of a class as is described in more detail in the sequel.

As indicated above, different approaches are possible to define classes and to determine the lpnt items belonging to each class. In certain cases lpnt items i may be assigned to more than one class c. This may be the case if an lpnt item has more than one label and each label defines a separate class. For example a movie may have a label 'Romance' and 'Drama' and the combination of both labels is not considered as a separate class. In that case keywords K(c) from more than one class are available to such a lpnt item. Different approaches are possible. According to a first approach all keywords Kw selected from the terms T(c) for each of the classes to which the lpnt item belong are added to the meta-data of the lpnt item. According to another approach a further selection is made from the keywords. For example the meta-data enrichment facility 30 may compose a combined list of the keywords obtained from each of the relevant classes for an lpnt item and provide an overall ranking therein according to their relevance. A subset of keywords having the highest ranking may then be selected from the keywords in the combined list. In this case it is necessary that the keyword generation facility 20 provides the meta-data enrichment facility 30 with the relevance indicator assigned to the keywords. Alternatively the keyword generation facility 20 may provide the meta-data enrichment facility 30 with a list of keywords for each class in a predetermined order corresponding to their relevance ranking (without specifying their relevance) and the meta-data enrichment facility 30 selects a subset of predetermined size from each of the lists.

In again another approach the meta-data enrichment facility 30 selects the cross-section of the sets of keywords assigned to each class, i.e. the meta-data enrichment facility 30 selects the keywords that are in common to each of the classes c to which the lpnt item i belongs.

The set of keywords Ki that is selected for a lpnt item (which may be identical to the set of keywords K(c) for the class to which the lpnt item belongs) may be added to the description. In this way the keywords can be found by an existing search engine. Alternatively, the keywords Ki may be included in a separate field as shown in the following Table 2.

TABLE 2

Meta-data for lpnt items i including a separate
field for additional keywords Ki

| Lpnt item | Set of labels | Description | Additional keywords |
|---|---|---|---|
| 1 | G1 | T1 | K1 |
| ... | ... | ... | ... |
| i | Gi | Ti | Ki |
| ... | ... | ... | ... |
| n | Gn | Tn | Kn |

Providing the lpnt item specific keywords Ki in a separate field of the meta-data for lpnt item i is advantageous as it allows a search engine to discriminate between keywords that actually occur in the original description of the lpnt item and keywords that are added. Suppose for example that the lpnt items are videos illustrating preparation of cooking recipes and that the search specifies "Italian" but NOT "Parmesan". In view of the fact that Italian cooking recipes frequently include Parmesan cheese as an ingredient, it is highly likely that this occurs as an additional keyword. In that case the search would reveal no hits. However, in case that the additional keywords are added in a separate entry of the metadata, the search engine determines that the recipe complies with the query as the original description does not include the keyword 'Parmesan'.

Figure 3A:
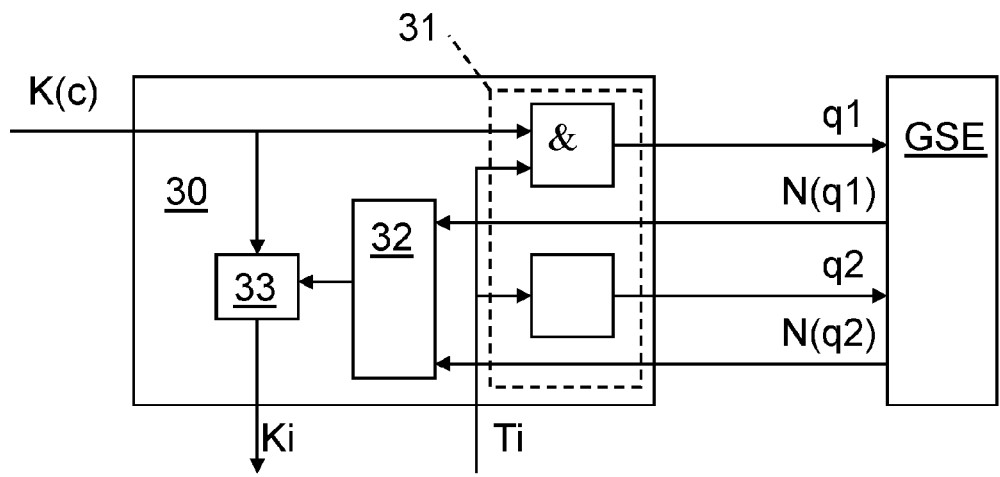
FIG. 3A shows another part of the embodiment of the data base system of FIG. 1.

FIG. 3A shows a meta data enrichment facility 30 in an embodiment of the data base system. In the embodiment shown the meta data enrichment facility 30 comprises a query issuing facility 31 for issuing a first query q1 and a second query q2 to a general search engine GSE. The first query q1 is performed on the basis of a title Ti of a lpnt item and a candidate keyword K(c) provided by the keyword generation facility 20. Accordingly, this query is directed to search targets that both include the title Ti AND the candidate keyword K(c). The second query q2 is performed on the basis of the title Ti of the lpnt item, without specifying the provided candidate keyword K(c). It is noted that in both cases the query should be directed to the title as a whole and not to the individual words appearing therein, for example by specifying the title between quotes. The queries q1, q2 may include one or more further terms in common to restrict the searches to a particular domain. For example if the lpnt items in the collection are movies, the queries q1, q2 may further include the keyword "movie". The meta-data enrichment facility 30 further comprises an additional relevance indication facility 32 for determining an lpnt item specific relevance of the candidate keyword K(c) using the number N(q1) of estimated hits for the first query q1 and the number N(q2) of estimated hits for the second query q2. The wording "estimated" is used here to indicate that not all search results need actually be truly related to the lpnt item involved. For example if the query is not explicitly restricted to movies a query with the search term "The Godfather" may also reveal books and games, but also results related to the original sense of godfather as a "sponsor for a child at baptism". Nevertheless, for the purpose of comparing the query results of queries 1 and 2, the number of results found by the general search engine is usually a good criterion. The lpnt item specific relevance of the candidate keyword may be based on the ratio N(q1)/N(q2), which is a number in the range of 0 to 1, provided that N(q2)≠0. Therein the candidate keyword may be considered particularly relevant if the ratio is equal to 1 and irrelevant if the ratio is equal to 0.

The meta-data enrichment facility 30 further comprises a blocking facility 33 for preventing that the provided candidate keyword is assigned to the meta-data of the lpnt item if the lpnt item specific relevance of the candidate keyword is less than a predetermined value. In this way an additional selection is made from the candidate keywords, i.e. class-related keywords to achieve a subset of keywords that is particularly relevant to a particular lpnt item which is a member of the class.

Figure 3B:
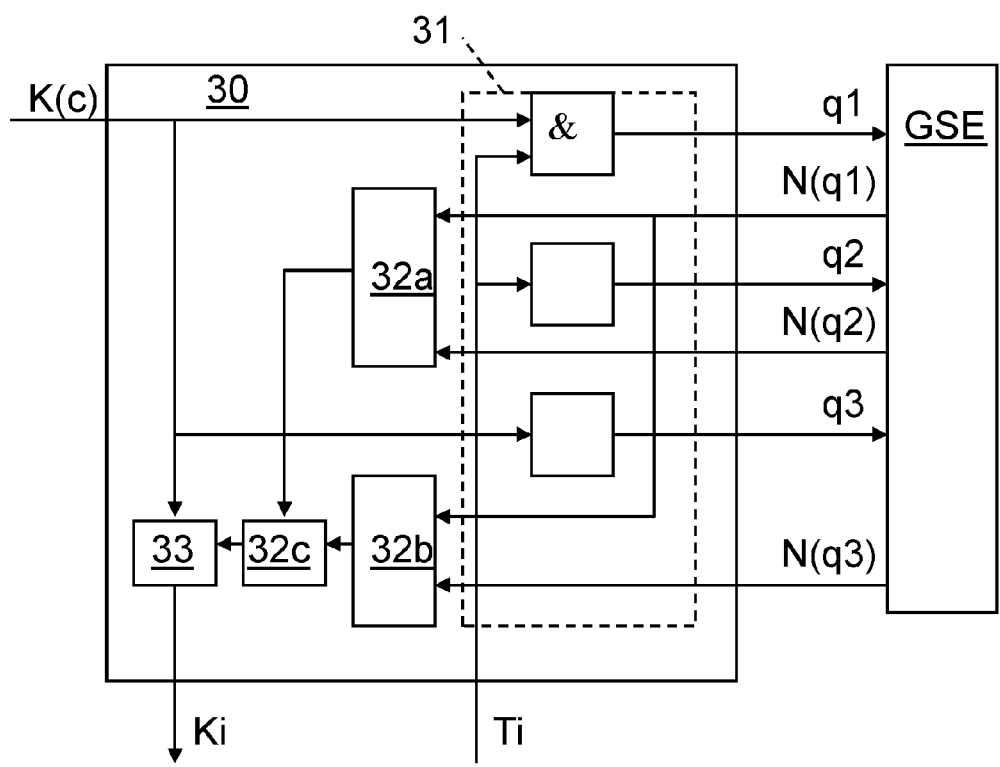
FIG. 3B shows that part in another embodiment of the data base system of FIG. 1, FIG. 4 schematically shows a further embodiment of a data base system according to the first aspect of the invention, FIG. 5 schematically shows again a further embodiment of a data base system according to the first aspect of the invention, FIG. 6 schematically shows a still further embodiment of a data base system according to the first aspect of the invention, FIG. 7 schematically shows an embodiment of a method according to the second aspect of the invention.

FIG. 3B shows a meta-data enrichment facility 30 of another embodiment of the data base system according to the first aspect of the invention. Therein the query issuing facility 31 is further arranged for issuing a third query q3 to the general search engine. This third query is performed on the basis of the candidate keyword provided by the generation facility 20. The title Ti of the lpnt item is not included in this query. In this embodiment the lpnt item specific relevance determined for the candidate keyword further depends on the number N(q3) of estimated hits for said third query q3. In this case the ratio N(q1)/N(q3) provides a further indication of the relevance of the candidate keyword for the lpnt item having title Ti. In the embodiment shown in FIG. 3B the ratio N(q1)/N(q2) is calculated by additional relevance indication part 32a, the ratio N(q1)/N(q3) is calculated by additional relevance indication part 32b, and additional relevance indication part 32c determines a Boolean relevance indicator R. Blocking facility 33 only provides the keyword K(c) as specific keyword Ki for lpnt item i if R is True. In an embodiment additional relevance indication part 32c determines that R=true iff (N(q1)/N(q2)>Thr12 AND N(q1)/N(q3)>Thr13), wherein Thr12 and Thr13 are predetermined threshold values.

Figure 4:
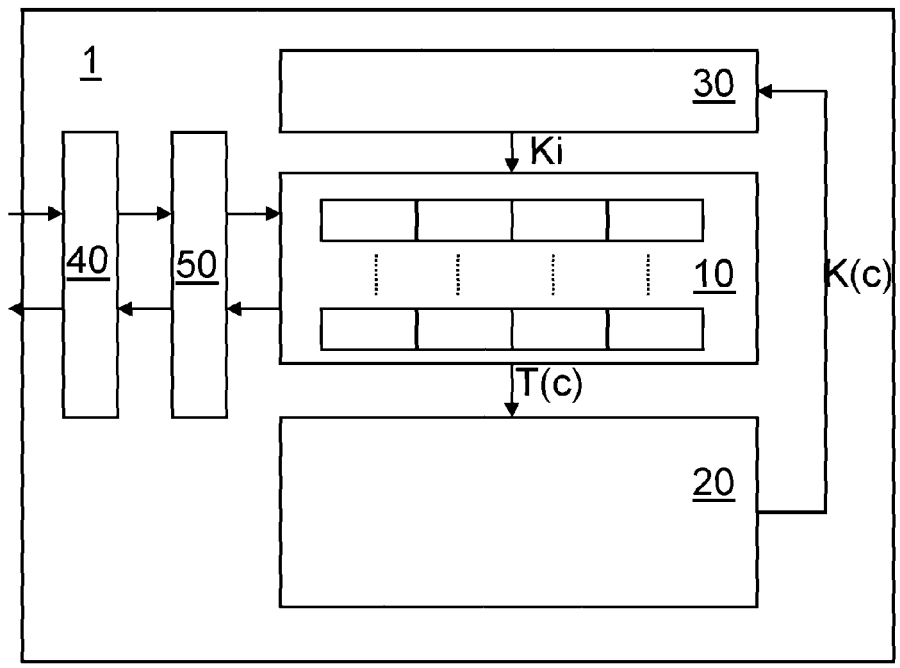

An embodiment of the data base system according to the first aspect as depicted in FIG. 4 further comprises a communication facility 40 for receiving a user search request USR for a lpnt item sought including a set Ku of one or more keywords. In the embodiment shown, the data base system further comprises a search facility 50 for performing a query in said enriched meta-data, based on the set of one or more keywords included in the search request.

Figure 5:
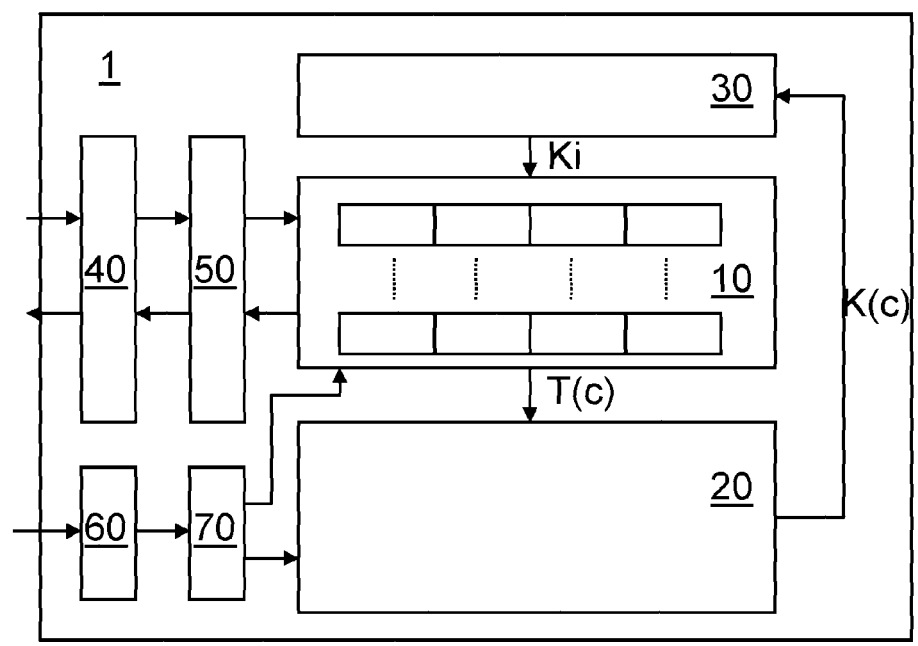

A further embodiment of the data base system as shown in FIG. 5, also comprises an input facility 60 for receiving meta-data about a new lpnt item i. The data base system of that embodiment additionally comprises an update facility 70 for storing said meta-data in the storage facility 10 and for updating the meta-data of the lpnt items in the collection. The process of updating the meta-data may take place batchwise, i.e. the assignment of keywords may take place anew for example each time after a predetermined number of lpnt items, e.g. 100 lpnt items, is added to the collection.

Preferably however, the metadata is updated iteratively. To enable this, a class-term-frequency table, see example table Table 3 is maintained as illustrated below. The class-term-frequency table comprises for each class (C1, C2, ..., Cn) a list (Term) of terms {T11, ... T1$n$1}, {T21, ..., T2$n$2}, ..., {Tm1, ..., Tm,nm} etc. Each of the lists of terms has a corresponding list of term frequencies {F11, ... F1$n$1}, and a list of reference frequencies {FR11, ... FR1$n$1}. In addition a list of normalized frequencies {FN11, ... FN1$n$1} may be maintained. This is however not necessary, as the latter list is calculated from the ratio FTc/Fref already available in the table.

For each added lpnt item $i_{new}$, this requires the following.

A term list is determined for the lpnt item $i_{new}$, comprising the terms occurring in the description, e.g. in the title, of the lpnt item.

A term frequency list is determined for the lpnt item, comprising an indication for the frequency with which the terms of said term list occur.

Based on the term frequency list the term frequency Ftc for the relevant class/classes is updated. I.e. for each class to which the new lpnt item $i_{new}$, belongs the term frequency Ftc is updated by incrementing the count with the frequency indicated in the term frequency list.

Also based on this information the reference frequency FRij for the term may be updated. Alternatively, a respective fixed reference frequency for each term may be presumed. 'However, as new terms are introduced over time, reference frequencies should be added for new terms over time. Additionally, as the frequency for some terms increases over time, and for others decreases over time, updating the reference frequencies over time is probably best done a few times per year.

Subsequently, the normalized frequency is updated for those classes for which the term statistics are changed due to the addition of the new lpnt item, i.e. the classes to which the new lpnt item belongs and if the reference frequencies are also updated also the other classes that contain one or more terms in the term list retrieved from the new lpnt item.

The meta-data of the lpnt item is enriched based on the set Kw of keywords earlier selected in the procedure for the class(es) to which the new lpnt item belongs.

If it follows from the step of updating the normalized frequencies that other keywords appear to be relevant for one or more classes then the meta-data of all lpnt items may be updated accordingly.

TABLE 3

Example of a class-term-frequency table

| Class | Term | Ftc | Fref | Ftc/Fref |
|---|---|---|---|---|
| C1 | T11, T12 ... | F11, F12 ... | FR11, FR12 ... | FN11, FN12 ... |
| C2 | T21, T22 ... | F21, F22 ... | FR21, FR22 ... | FN21, FN22 ... |
| ... | ... | ... | ... | ... |
| Ci | Ti1 | Fi1 | FRi1 | TFIDFi1 |
| ... | ... | ... | ... | ... |

Figure 6:
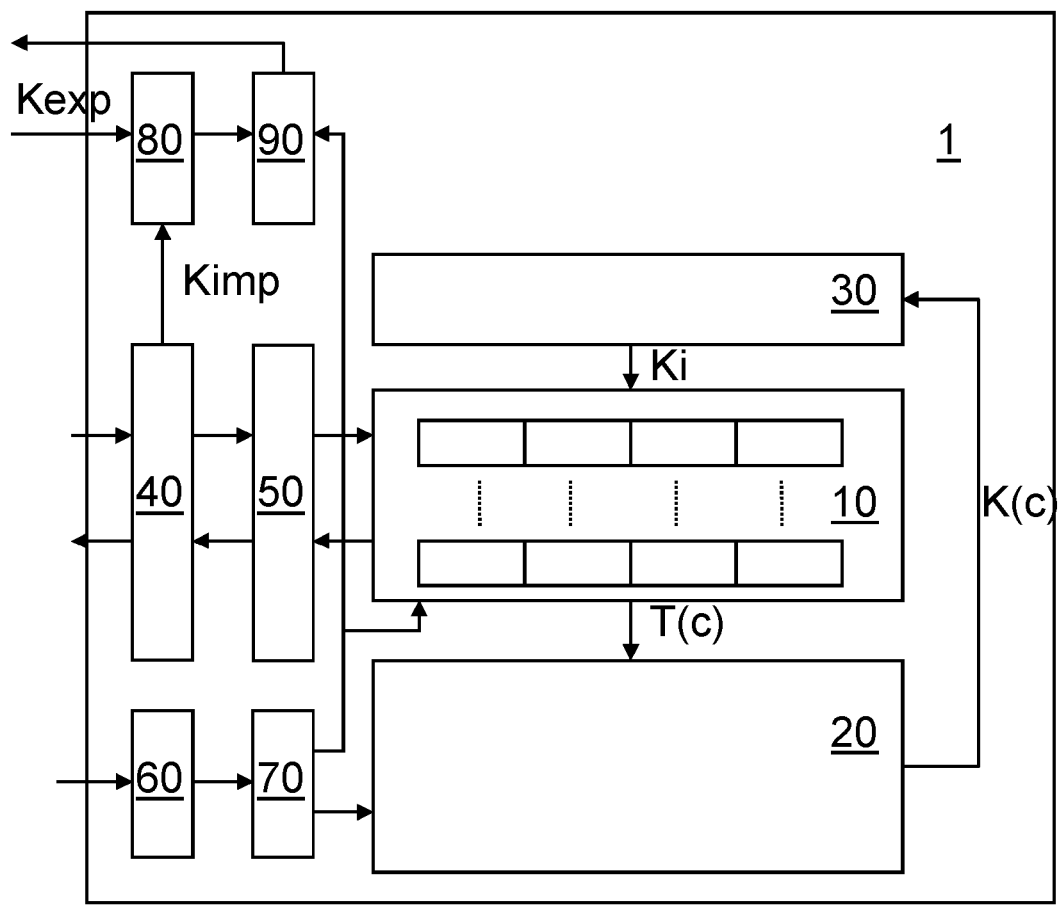

Again another embodiment of the data base system according to the first aspect of the invention is shown in FIG. 6. The data base system shown therein further comprises a user profile storage facility 80 for storing user profiles. A user profile at least comprises user specified keywords. The user specified keywords may be specified explicitly (Kexp) by the user. Alternatively, the system may detect which keywords are frequently used by the user and add these as implicit keywords (Kimp) to the user profile. The embodiment of the data base system shown in FIG. 6 further comprises a recommender facility 90. Upon receiving meta-data about a new lpnt item and after updating the meta-data of the new lpnt item, the recommender facility 90 compares the updated meta-data of the new lpnt item with the respective user specified keywords for each user. Then the recommender facility 90 recommends the new lpnt item to those users for which the profile matches the updated meta-data of the new lpnt item.

Figure 7:
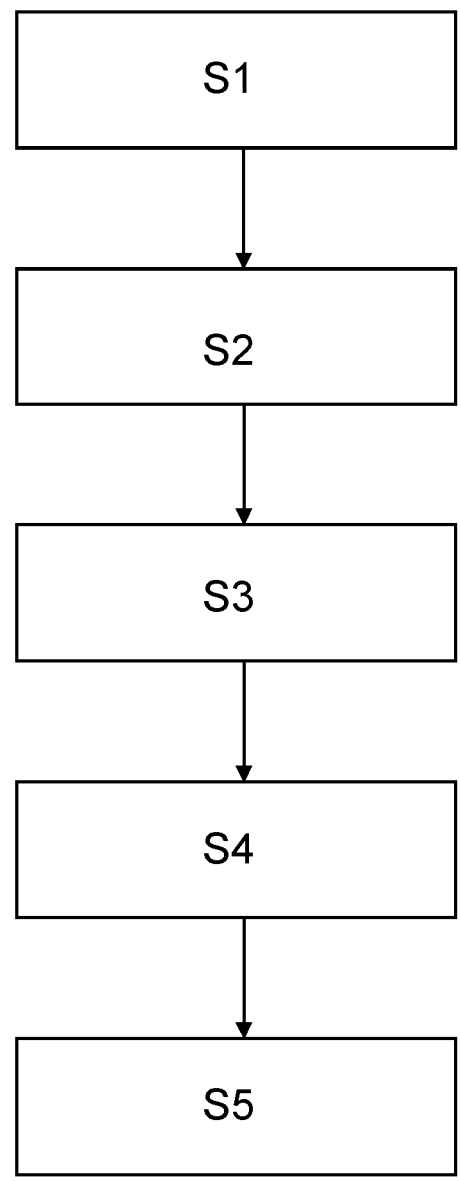

FIG. 7 schematically shows a method according to the second aspect of the present invention. The inventive method for storing meta-data about lpnt items in a collection of labeled lpnt items comprises a first step S1, wherein respective meta-data is stored for lpnt items within the collection. The meta-data comprising at least one lpnt item classification and a lpnt item description. As discussed above, a lpnt item may be assigned more than one lpnt item classification. The lpnt item classifications define classes.

Various alternatives are possible for the relation between lpnt item classifications and class definitions. According to one definition each classification is associated with a class, so that lpnt items having more than one classification belong to different classes. According to another definition each combination of classifications defines a class. In that case each lpnt item only belongs to one class. Alternatively a hybrid definition is possible. For example a class may be defined by the combination of classifications as in the second definition, provided that sufficient lpnt items have this combination of classifications. If the number of lpnt items with this combination is less than a threshold value, e.g. less than 10, then the lpnt items are assigned to classes formed by the individual classifications or by respective subsets of these classifications. The method according the present invention is operative for lpnt items, i.e. the amount of data necessary to encode the text occurring in the lpnt item in ascii code is at most 1% of the total amount of data used for encoding the lpnt item. Typically also the average number of words in the descriptions of the lpnt items in the collection is low, e.g. a few hundred words, e.g. at most 100, or even not more than 10 words.

The method comprises a second step S2 of retrieving terms for respective classes from lpnt item descriptions of lpnt items associated with said classes. Accordingly, for each class it is determined which lpnt items belong thereto and it is determined which terms appear in the descriptions of these lpnt items. A pre-selection step may be applied to filter out very common words, such as the articles 'the' and 'a'.

In a next step S3 a relevance is assigned to the retrieved terms for a class.

In step S4 terms are selected from the retrieved terms on the basis of their assigned relevance and provided as candidate keywords. Typically, only a true subset will be selected. However, if only a small number of terms is available, all of these may be provided as candidate keywords.

In step S5 a subset of the provided candidate keywords is added to the meta-data of lpnt items of a class. Although it may be considered to add all candidate keywords of a class to all of the lpnt items of the class, this may in practice not be useful. For example, the subset of provided candidate keywords that are added to an lpnt item may comprise the candidate keywords that do not already occur in the lpnt item description.

Figure 8:
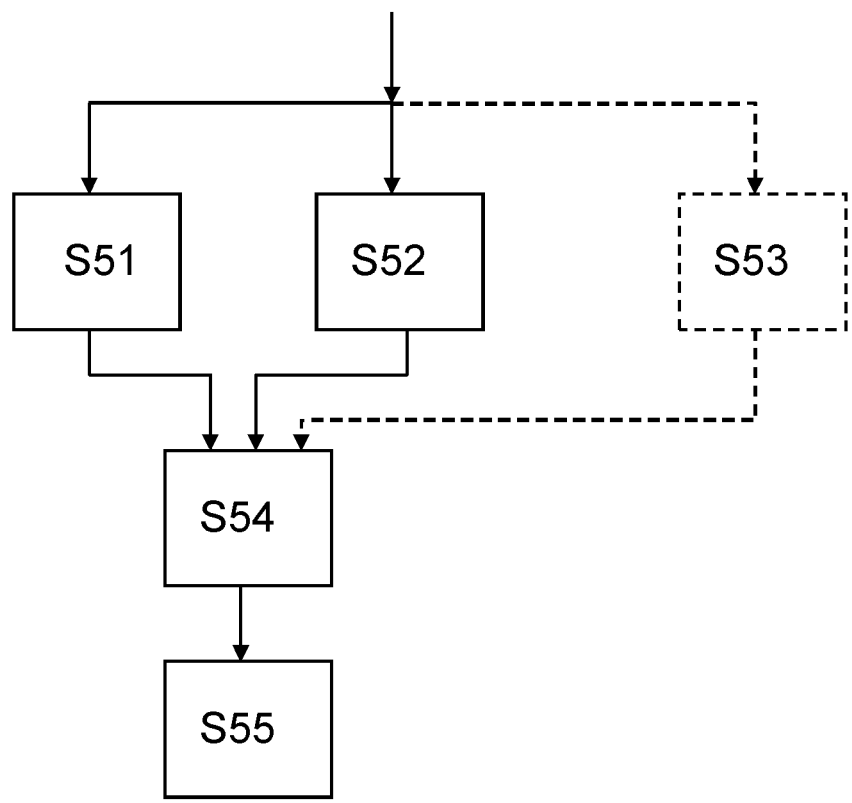
FIG. 8 shows in more detail an aspect of a further method according to the second aspect of the invention.

Moreover, the subset of the provided candidate keywords may additionally be restricted by the additional selection procedure as described with reference to FIG. 8. In this additional selection procedure a first and a second query q1, q2 are issued to a general search engine in steps S51, S52 respectively. The queries may be issued in any order, or simultaneously. The first query q1 in step S51 is performed on the basis of a title of an lpnt item and a candidate keyword, i.e. a keyword generated for the/a class to which the lpnt item belongs. The second query q2 in step S52 is performed on the basis of the title of the lpnt item, without specifying that candidate keyword. Subsequently, in step S54 a lpnt item specific relevance of the candidate keyword is determined using the number of estimated hits resulting from the first query (q1) and the number of estimated hits resulting from the second query (q2). In step S55 the provided candidate keyword is excluded from the subset of keywords to be assigned to the meta-data of the lpnt item if it was determined in step S54 that the lpnt item specific relevance of the keyword is less than a predetermined value.

In an embodiment of the method, a third query (q3) is issued to the general search engine in step S53. The third query q3 is performed on the basis of the candidate keyword without specifying the title of the lpnt item. The queries q1, q2, q3 may be issued in any order, or simultaneously. In the subsequent step S54 an lpnt item specific relevance is determined for the candidate keyword that further depends on the number of estimated hits for said third query (q3).

The invention claimed is:

1. A system for storing meta-data about labeled predominantly non-textual (lpnt) items, the system comprising:
   a storage facility configured for storing the meta-data for the lpnt items, the meta-data comprising at least one label and a description of each lpnt item, wherein the amount of data necessary to encode text occurring in an lpnt item in ascii code is at most 1% of the total amount of data used for encoding the lpnt item;
   a keyword generation facility configured for assigning a relevance to terms retrieved from the description of the lpnt item, for selecting the terms based on the assigned relevance and providing the selected terms as candidate keywords; and
   a meta-data enrichment facility configured for adding a subset of the candidate keywords generated for a class as selected keywords to the meta-data of the lpnt items of the class, wherein the meta-data enrichment facility is configured for issuing a first query and a second query the first query being based on a title of the lpnt item and a candidate keyword, and the second query being based on the title of the lpnt item, wherein the meta-data enrichment facility is configured for determining a specific relevance of the candidate keyword using a number of estimated hits for the first query and a number of estimated hits for the second query, and wherein the meta-data enrichment facility is configured for preventing the candidate keyword from being assigned to the meta-data of the lpnt item when the specific relevance of the candidate keyword for the lpnt item is less than a predetermined value.

2. The system according to claim 1, wherein the lpnt items are play items for reproduction by a media reproduction device.

3. The system according to claim 1, further comprising a term relevance determining module configured to provide a frequency indication indicative of a frequency of a term for the lpnt items in a respective class, the keyword generation device being further configured to provide a reference indication indicative of a frequency of the term in all lpnt items, and a normalization unit configured for determining the relevance of the term in accordance with the frequency indication and the reference indication.

4. The system according to claim 1, wherein the meta-data enrichment facility is further configured for issuing a third query based on the candidate keyword, and wherein the specific relevance determined for the candidate keyword depends on a number of estimated hits for the third query.

5. The system according to claim 1, wherein the meta-data enrichment facility is configured for adding the selected keywords to the meta-data separate from an entry for storing the description.

6. The system according to claim 1, further comprising:
   a communication facility configured for receiving a user search request including a set of one or more user specified keywords; and
   a search facility configured for performing another query based on the set of one or more user specified keywords.

7. The system according to claim 6, further comprising:
   an input facility configured for receiving meta-data about a new lpnt item; and
   an update facility configured for updating the meta-data of the lpnt items.

8. The system according to claim 7, further comprising
   a user profile storage facility configured for storing user profiles, a user profile at least comprising user specified keywords; and
   a recommender facility configured for, upon receiving the meta-data about the new lpnt item and after updating the meta-data of the new lpnt item, comparing the updated meta-data of the new lpnt item with the respective user specified keywords for each user and for recommending the new lpnt item to users for which the user specified keywords match the updated meta-data of the new lpnt item.

9. A method for storing meta-data about labeled predominantly non-text (lpnt) items, the method comprising:
   storing the meta-data for the lpnt items, the meta-data comprising at least one label and a description of each lpnt item, wherein the amount of data necessary to encode text occurring in an lpnt item in ascii code is at most 1% of the total amount of data used for encoding the lpnt item;
   retrieving terms from descriptions of the lpnt items;
   assigning a relevance to the terms;
   selecting the terms based on the assigned relevance and providing the selected terms as candidate keywords;
   adding a subset of the candidate keywords to the meta-data of the lpnt items of a class;
   issuing a first query and a second query, the first query being based on a title of the lpnt item and a candidate keyword, and the second query being based on the title of the lpnt item;
   determining a specific relevance of the candidate keyword using a number of estimated hits for first query and a number of estimated hits for the second query; and
   preventing the candidate keyword from being assigned to the meta-data of the lpnt item when the specific relevance of the candidate keyword is less than a predetermined value.

10. The method according to claim 9, wherein the lpnt items are play items for reproduction by a media reproduction device.

11. The method according to claim 9, further comprising providing a frequency indication indicative of a frequency of the term for the lpnt items in a respective class providing a reference indication indicative of a frequency of the term in all lpnt items, and determining the relevance of the term in accordance with the frequency indication and the reference indication.

12. The method according to claim 9, further comprising issuing a third query based on the candidate keyword, wherein the specific relevance determined for the candidate keyword depends on a number of estimated hits for the third query.

13. The method according to claim 9, wherein the subset is added to the meta-data separate from an entry for storing the description.

14. The method according to claim 9, further comprising:
   receiving a user search request including a set of one or more user specified keywords; and
   performing another query based on the set of one or more user specified keywords.

15. A non-transitory computer-readable medium having one or more executable instructions stored thereon, which when executed by a processor, cause the processor to perform a method for storing meta-data about labeled predominantly non-text (lpnt) items, the method comprising:

storing the meta-data for the lpnt items, the meta-data comprising at least one label and a description of each lpnt item, wherein the amount of data necessary to encode text occurring in an lpnt item in ascii code is at most 1% of the total amount of data used for encoding the lpnt item;

retrieving terms from descriptions of the lpnt items;

assigning a relevance to the terms;

selecting the terms based on the assigned relevance and providing the selected terms as candidate keywords;

adding a subset of the candidate keywords to the meta-data of the lpnt items of a class;

issuing a first query and a second query, the first query being based on a title of the lpnt item and a candidate keyword, and the second query being based on the title of the lpnt item;

determining a specific relevance of the candidate keyword using a number of estimated hits for the first query and a number of estimated hits for the second query; and preventing the candidate keyword from being assigned to the meta-data of the lpnt item when the specific relevance of the candidate keyword for the lpnt item is less than a predetermined value.

* * * * *